(12) United States Patent
Berke

(10) Patent No.: US 7,104,577 B1
(45) Date of Patent: Sep. 12, 2006

(54) BARBECUE SKEWER AND METHOD

(76) Inventor: Joseph J. Berke, 3248 Interlaken, West Bloomfield, MI (US) 48323

( * ) Notice: Subject to any disclaimer, the term of this patent is extended or adjusted under 35 U.S.C. 154(b) by 0 days.

(21) Appl. No.: 10/737,883

(22) Filed: Dec. 18, 2003

(51) Int. Cl.
*A01K 81/04* (2006.01)

(52) U.S. Cl. ........................................ 294/61

(58) Field of Classification Search ............... 294/61, 294/51; 99/421 A, 421 R, 421 V, 446, 421 H; 30/164.7, 128
See application file for complete search history.

(56) References Cited

U.S. PATENT DOCUMENTS

| | | | | |
|---|---|---|---|---|
| 2,390,309 A | * | 12/1945 | Keys | 30/443 |
| 2,876,694 A | * | 3/1959 | Thomas | 99/421 A |
| 5,063,628 A | * | 11/1991 | Campbell | 7/116 |
| 5,163,917 A | * | 11/1992 | Huefner et al. | 604/198 |
| 5,749,286 A | * | 5/1998 | Payette | 99/413 |
| 5,997,513 A | * | 12/1999 | Smith et al. | 604/198 |
| 6,286,418 B1 | * | 9/2001 | Berke et al. | 99/421 A |

* cited by examiner

*Primary Examiner*—Eileen D. Lillis
*Assistant Examiner*—Esther Onyinyechi Okezie
(74) *Attorney, Agent, or Firm*—Alex Rhodes

(57) ABSTRACT

A barbecue skewer with a protector/extractor for extracting food from the skewer and preventing injuries and contamination of the skewer. The protector/guard is a generally cylindrical member which is slidably mounted on a shank of the skewer and is selectively movable for a position of covering relationship with a pointed end portion of the shank of the skewer to a position of uncovering relationship with the pointed end portion of the shank of the skewer. In a first embodiment, the protector/extractor is retained in the positions of covering and uncovering relationship by the attraction of a permanent magnet and ferromagnetic members. In a second embodiment the protector/extractor is retained in the positions of covering and uncovering relationship with a leaf spring mounted on the protector/retractor. In a third embodiment the protector/extractor is retained in the positions of covering and uncovering relationship by the engagements of a spring biased ball in the protector/extractor and grooves in a shank of the skewer.

4 Claims, 4 Drawing Sheets

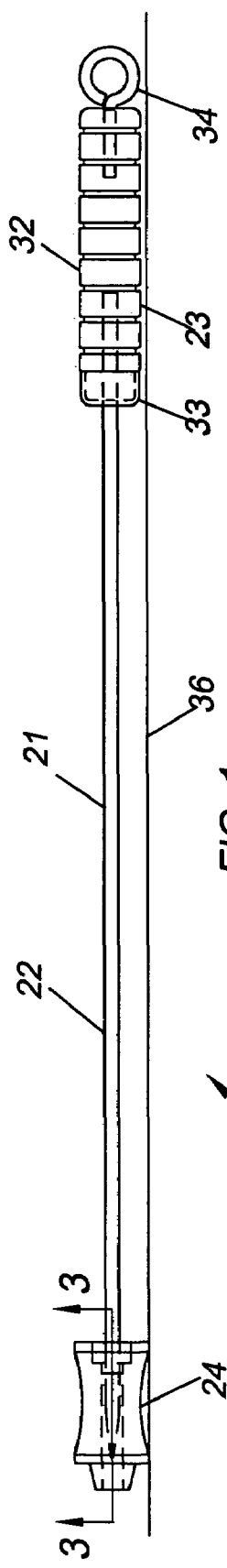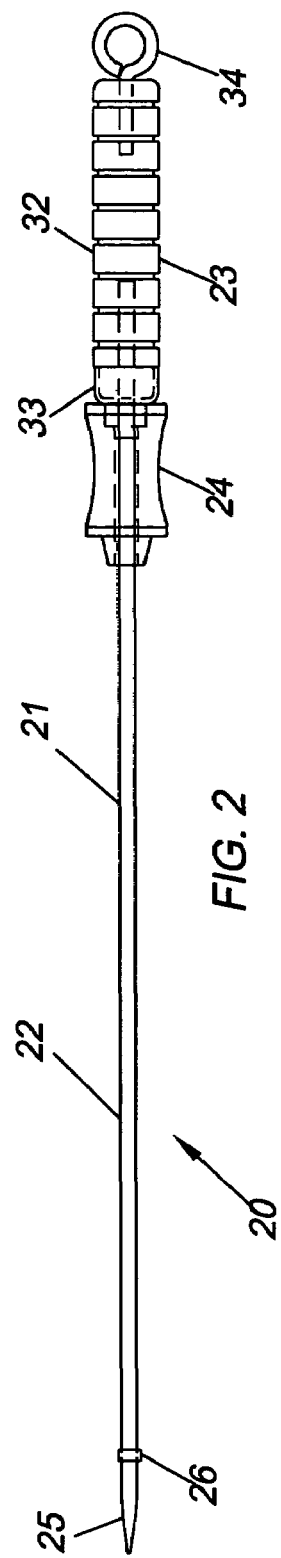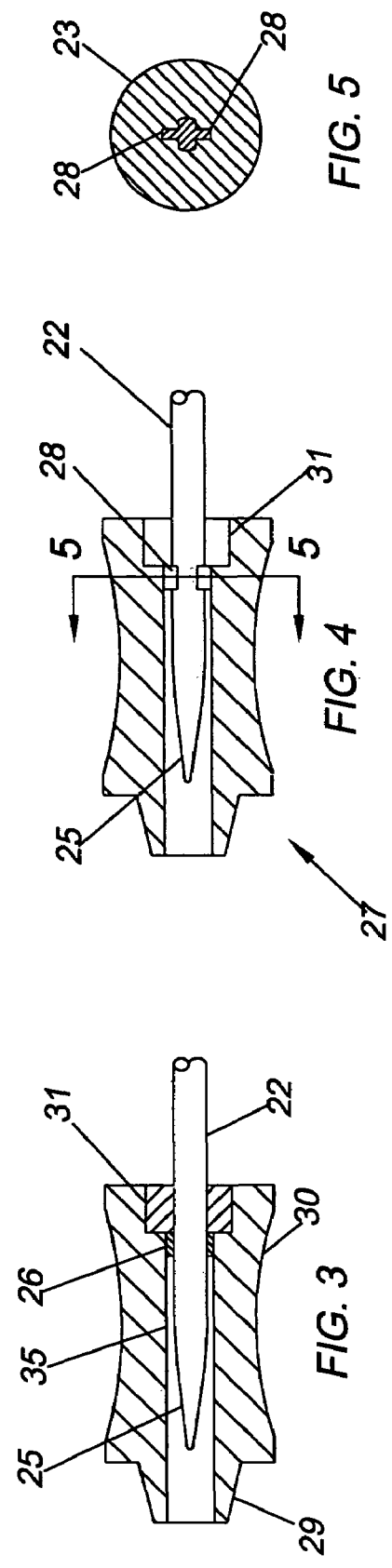

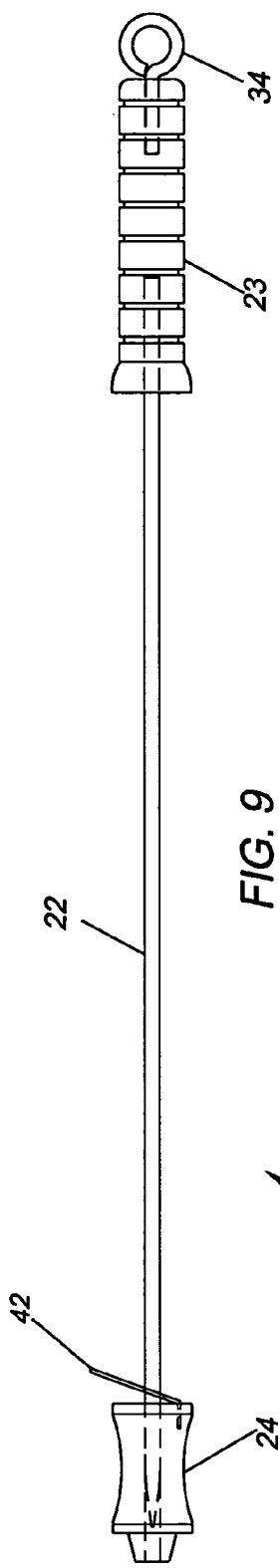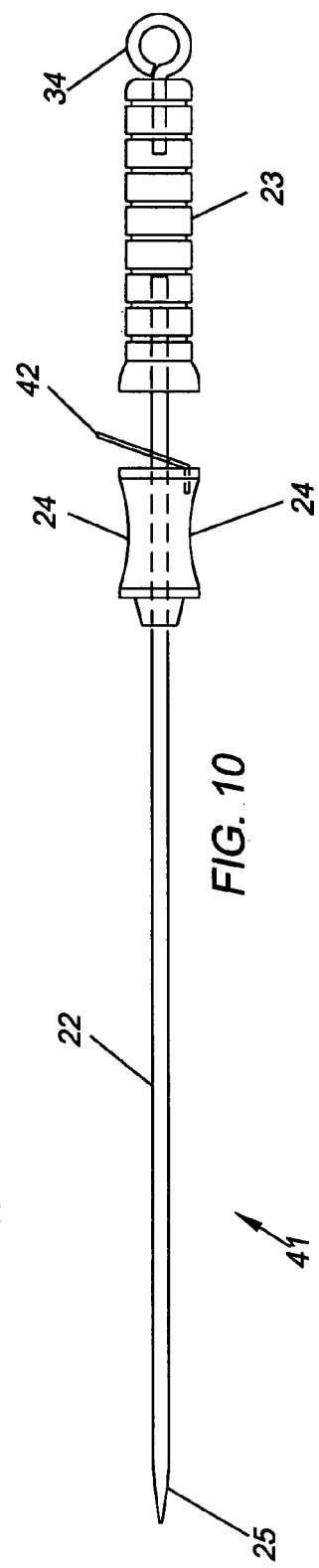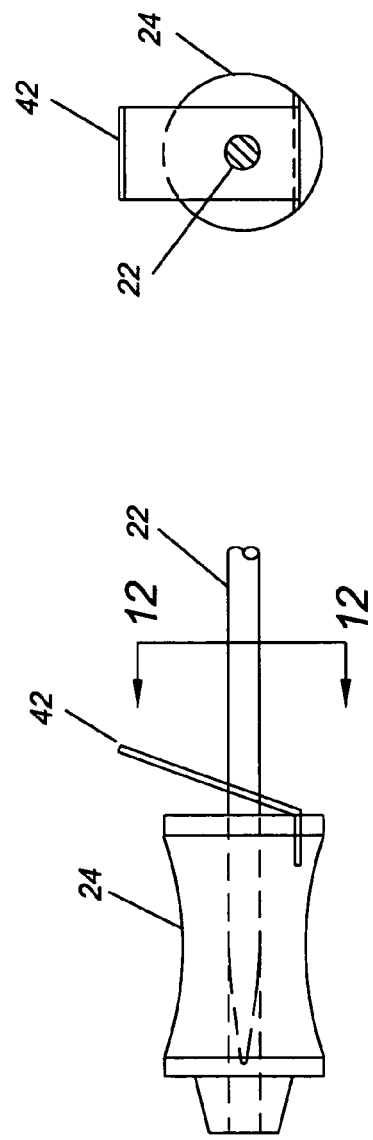

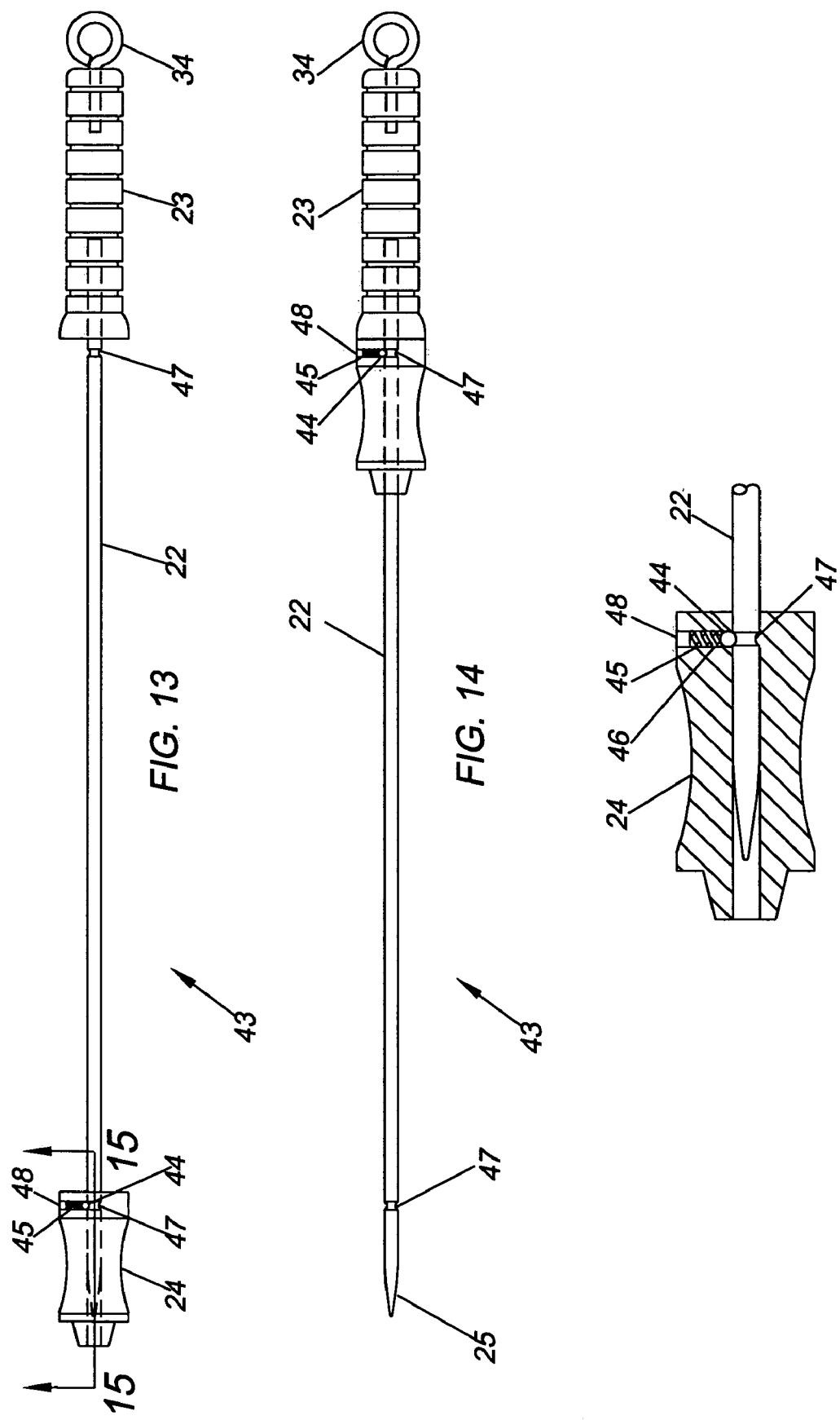

US 7,104,577 B1

BARBECUE SKEWER AND METHOD

FIELD OF THE INVENTION

This invention relates to cooking utensils and more particularly to a barbecue skewer with a protector/extractor and method.

BACKGROUND OF THE INVENTION

Barbecue skewers are used to support and manipulate food outdoors and in kitchens. They generally consist of a pointed shank and an adjoining handle. While skewers usually have eyelets for suspending them from hooks, when they are not in use, their pointed ends are often unprotected and they are often placed on contaminated surfaces. While they fulfill their intended use, they suffer from a number of shortcomings such as causing injuries from their unprotected pointed ends, difficulties in extracting food from the skewer, and contamination of the skewer from dirt and bacteria. With these shortcomings in mind, it is clear that a need exists for improvements that will facilitate food extraction and prevent injuries and food contamination with barbecue skewers.

SUMMARY OF THE INVENTION

The present invention resides in a movable protector and food extractor slidably mounted on a barbecue skewer for extracting food and preventing injuries and contamination from a barbecue skewer. One feature, which in itself is believed to be novel, is a magnet means for selectively retaining the protector/extractor at opposite end portions of a skewer. Although several optional means of retaining the extractor and guard are disclosed which fall within the spirit of the invention, they are not intended to limit the scope of the invention.

Other objects and further scope of applicability of the present invention will become apparent from the detailed description given hereafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be better understood and further objects, characterizing features, details and advantages thereof will appear more clearly with reference to the diagrammatic drawings illustrating preferred embodiments of the invention by way of non-limiting example only.

FIG. 1 is a side view of a barbecue skewer and protector showing the protector in a first operative position according to the present invention.

FIG. 2 is the side view of the barbecue skewer showing the protector in a second operative position.

FIG. 3 is an enlarged cross-sectional view taken on the line 3—3 in FIG. 1.

FIG. 4 is an enlarged cross-sectional view of an alternate embodiment taken in the same manner as FIG. 3.

FIG. 5 is a cross-sectional view taken on the line 5—5 in FIG. 4.

FIG. 9 is a side view of a third alternate embodiment of the barbecue skewer and protector showing the protector in a first operative position according to the present invention.

FIG. 10 is the side view of the FIG. 9 embodiment showing the protector in a second operative position.

FIG. 11 is an enlarged fragmentary view of the FIG. 9 embodiment with the protector in the first operative position.

FIG. 12 is a cross-sectional view taken on the line 12—12 in FIG. 11.

FIG. 13 is a side view of a fourth alternate embodiment of the barbecue skewer and protector showing the protector in a first operative position according to the present invention.

FIG. 14 is the side view of the FIG. 13 embodiment showing the protector in a second operative position.

FIG. 15 is an enlarged cross-sectional view taken on the line 15—15 in FIG. 13.

DESCRIPTION OF THE PREFERRED EMBODIMENTS

Figure 6:
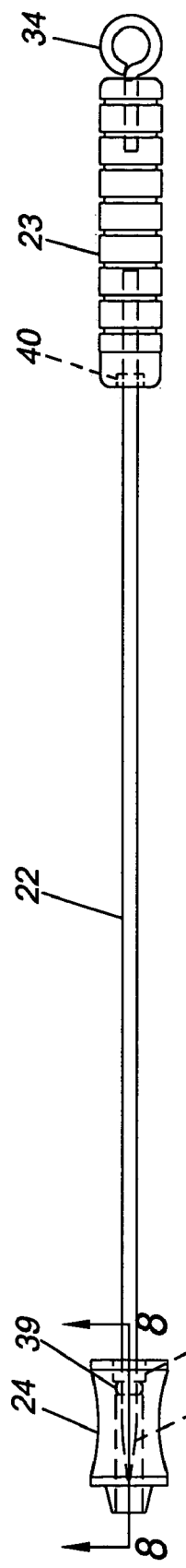
FIG. 6 is a side view of a second alternate embodiment of the barbecue skewer and protector showing the protector in a first operative position according to the present invention.

Referring now in detail to the drawings wherein like numerals designate like and corresponding parts throughout the views for the purpose of illustrating preferred embodiments of the present invention, in FIGS. 1 through 3 is shown an embodiment 20 consisting of a barbecue skewer 21 with a protector/extractor 24 according to the present invention. The barbecue skewer 21 is comprised of a pointed shank 22 and a handle 23 attached to the shank 22. The protector/extractor 24 is slidably mounted on the shank 22, as shown in FIG. 1, and is selectively movable from a position shown in FIG. 1 in covering relationship to the pointed end of the shank 22, and as shown in FIG. 2, in uncovering relationship to the pointed end 25 of the shank 22.

Spaced a short distance from the pointed end portion 25 is a thin steel ring 26 whose function will be later described in proper sequence. In FIGS. 4 and 5 an alternate embodiment 27 is shown wherein the steel ring 26 is replaced by a pair of outward extending portions 28 of the shank 22.

As shown in FIGS. 1–3, the protector/extractor 24 is a generally cylindrical member comprised of a cylindrical front extractor portion 29, a concentric larger diameter adjoining body portion 30 and a concentric ring shaped permanent magnet 31. The permanent magnet 31 is mounted in a rear portion of the protector/extractor 24. The handle 23 is conventional and is comprised of a wood or plastic body 32, a steel (ferromagnetic) trim cap 33 on a front portion of the body 32 and an eyelet 34 on a rear potion of the body 32. A closely fitting aperture 35 extends through the center of the protector/extractor 24.

The invention is intended to be used as follows. When the skewer 21 is not in use, the protector/extractor 24 is slidably moved to the position shown in FIG. 1 and is retained in covering relationship to the pointed end portion 25 of the shank 22 by the magnetic attraction of the magnet 31 to the thin metal ring 26 on the shank 22. In the protected position, injuries are prevented from the pointed end portion 25 of the shank 22. When the skewer 21 is stored on its side, as shown in FIG. 1, on a contaminated surface 36, by way of example, a table or shelf, contamination is prevented by the protector/extractor 24 which cooperates with the handle 23 to space the shank 22 away from the contaminated surface 36 Contamination is also prevented when food is extracted by the contact of the protector/extractor 24 rather than a hand.

When the skewer 21 is placed in service, the protector/extractor 24 is moved to the uncovering position shown in FIG. 2 and is retained to the handle 23 by the magnetic attraction of the magnet 31 to the steel (ferromagnetic) trim cap 35 on the end of the handle 23. Food is extracted from the skewer 21 by moving the protector/extractor 24 toward the pointed end portion 25 of the shank 22.

Figure 7:
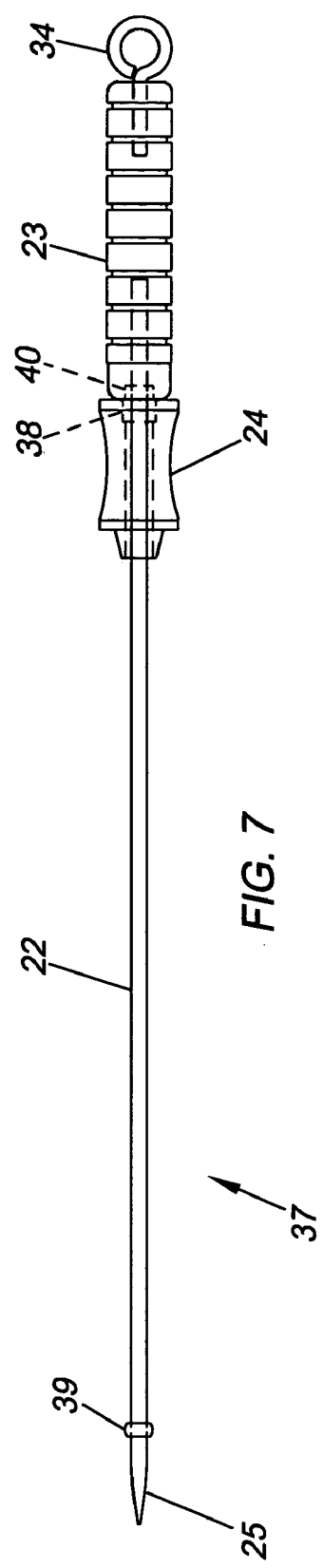
FIG. 7 is the side view of the FIG. 5 embodiment showing the protector in a second operative position.
Figure 8:
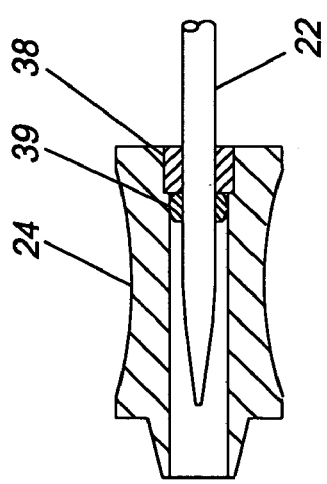
FIG. 8 is an enlarged cross-sectional view taken on the line 8—8 in FIG. 6.

Referring now to FIGS. 6 through 8, an embodiment 37 is shown wherein the magnet 31 in the protector/extractor 24 is replaced with a steel (ferromagnetic) ring 38, the thin steel (ferromagnetic) ring 26 on the shank 22 is replaced with a ring magnet 39 and the steel (ferromagnetic) trim cap 33 in the handle 23 is replaced with a ring magnet 40. The protector/extractor 24 is retained in the covering position, as shown in FIG. 6, by the magnetic attraction of the steel (ferromagnetic) ring 38 with the ring magnet 39 on the shank 22 and is retained in the uncovering position, as shown in FIG. 7, by the magnetic attraction of the steel (ferromagnetic) ring 38 with the ring magnet 40 on the handle 23.

In FIGS. 9 through 12, an embodiment 41 is shown wherein a flat metal leaf spring 42 is used to retain the protector/extractor 24 in the covering and uncovering positions. The protector/extractor 24 is released from the shank 22 and is selectively moved to the covering position, as shown in FIG. 9, and the uncovering position, as shown in FIG. 10, by deflecting the leaf spring 42 during the movement of the protector/extractor 24 on the shank 22.

In FIGS. 13 through 15 an embodiment 43 is shown wherein a ball 44 and a coil spring 45 are provided in an aperture 46 of the handle 23 of the protector/extractor 24 and grooves 47 are provided in the shank 22 for retaining the protector/extractor 24 in the covering position, as shown in FIG. 13, and the uncovering position, as shown in FIG. 14, by engaging the ball 44 with the grooves 47 of the shank 22. The ball 44 and spring 45 are retained in the handle 23 by a plug 48 or some other suitable means.

The invention being thus described, it will be obvious that the same may be varied in many ways. Such variations, by way of example, retaining the protector/extractor in the covering and the uncovering relationships with the pointed end portion of the shank by friction, alone, are not to be regarded as a departure from the spirit and scope of the invention, and all such modifications as would be obvious to one skilled in the art are intended to be included in the scope of the following claims.

What I claimed is new is:

1. A method for extracting food from a barbecue skewer, for protecting persons from injuries from pointed end portions of barbecue skewers and for preventing contamination of barbecue skewers comprising the steps of: slidably mounting a protector/extractor on a shank of said barbecue skewer; selectively moving said protector/extractor toward a handle of said skewer to uncover a pointed end portion of said skewer; fixedly retaining said protector on handle in said fixed fore-and-aft positions of uncovering relationship with said pointed end portion of said skewer by the attraction of a permanent magnet in said handle and a ferromagnetic member at a fixed fore-and-aft position on said shank for loading food on said skewer; loading food on said pointed end portion of said skewer; selectively moving said protector/extractor toward said pointed end portion of said skewer to extract said food from said skewer; and retaining said protector/extractor in fixed fore-and-aft position of covering relationship with said pointed end portion of said skewer to prevent injuries and contamination of said skewer.

2. A method for extracting food from a barbecue skewer, for protecting persons from injuries from pointed end portions of barbecue skewers and for preventing contamination of barbecue skewers comprising the steps of: slidably mounting a protector/extractor on a shank of said barbecue skewer; selectively moving said protector/extractor toward a handle of said skewer to uncover a pointed end portion of said skewer; fixedly retaining said protector on said handle by the attraction of a permanent magnet on said shank and a ferromagnetic member in said handle for loading food on said skewer; loading food on said pointed end portion of said skewer; selectively moving said protector/extractor toward said pointed end portion of said skewer to extract said food from said skewer; and retaining said protector/extractor in fixed fore-and-aft positions of covering relationship with said pointed end portion of said skewer to prevent injuries and contamination of said skewer.

3. A method for extracting food from a barbecue skewer, for protecting persons from injuries from pointed end portions of barbecue skewers and for preventing contamination of barbecue skewers comprising the steps of: slidably mounting a protector/extractor on a shank of said barbecue skewer; selectively moving said protector/extractor toward a handle of said skewer to uncover a pointed end portion of said skewer; fixedly retaining said protector on said handle by engaging an aperture of a leaf spring with said shank of said skewer for loading food on said skewer; loading food on said pointed end portion of said skewer; selectively moving said protector/extractor toward said pointed end portion of said skewer to extract said food from said skewer; and retaining said protector/extractor in fixed fore-and-aft positions of covering relationship with said pointed end portion of said skewer to prevent injuries and contamination of said skewer.

4. A method for extracting food from a barbecue skewer, for protecting persons from injuries from pointed end portions of barbecue skewers and for preventing contamination of barbecue skewers comprising the steps of: slidably mounting a protector/extractor on a shank of said barbecue skewer; selectively moving said protector/extractor toward a handle of said skewer to uncover a pointed end portion of said skewer; fixedly retaining said protector on said handle by engaging a spring biased ball in said handle with a groove in said shank of said skewer.

* * * * *